United States Patent [19]

Nemesi

[11] 4,278,454
[45] Jul. 14, 1981

[54] FILTER APPARATUS WITH REVERSE FLOW CLEANING

[75] Inventor: Stephen A. Nemesi, Louisville, Ky.

[73] Assignee: Wehr Corporation, Milwaukee, Wis.

[21] Appl. No.: 42,963

[22] Filed: May 29, 1979

[51] Int. Cl.³ ............................................. B01D 46/04
[52] U.S. Cl. .................... 55/302; 55/341 R; 55/379; 55/484; 55/492; 55/498; 55/502; 55/521
[58] Field of Search ...................... 55/293, 302, 341 R, 55/291, 344, 379, 418, 484, 492, 498, 502, 521

[56] References Cited

U.S. PATENT DOCUMENTS

| | | | |
|---|---|---|---|
| 3,499,268 | 3/1970 | Pausch | 55/302 |
| 3,606,736 | 9/1971 | Leliaert et al. | 55/302 |
| 3,726,066 | 4/1973 | Colley et al. | 55/302 |
| 3,853,509 | 12/1974 | Leliaert | 55/341 R |
| 4,042,356 | 8/1977 | Miller | 55/341 R |

Primary Examiner—Kathleen J. Prunner

[57] ABSTRACT

Cartridge type filters are suspended in hopper. Contaminated air flows into the hopper, passes through the filters and clean air is removed through an exhaust duct. Periodically a reverse stream of compressed air is directed through an inductor unit into each filter from the exhaust side to pressurize the filters and clean contaminants from the outer surface of the filter medium. With reference to the flow of the reverse stream, the walls of the inductor flare generally on a taper upstream from a restricted throat to a generally bowl-shaped section which flares to a diameter greater than the diameter of the throat. The bowl-shaped section extends upstream to merge with an arcuate section of a bell-mouth inlet which is convex to the exhaust chamber and terminates in a lateral flanged end. The throat is generally arcuate and convex to the inductor interior. The reverse stream, coming from a nozzle above each inductor, does not impinge on the inductor interior walls until it reaches an area immediately upstream of the throat. Air aspirates into the unit over the bell-mouth section and is accelerated and merged with the main reverse stream passing through the throat into the filters. The relationship of the minimum throat diameter, interior diameter of the filter and the distance from the minimum throat diameter to the bottom of the filter medium is such that the stream discharged through the throat does not impinge on the inner walls of the filter medium. The downstream end of the inductor is generally bell-mouth shaped having an arcuate section merging with the throat.

9 Claims, 4 Drawing Figures

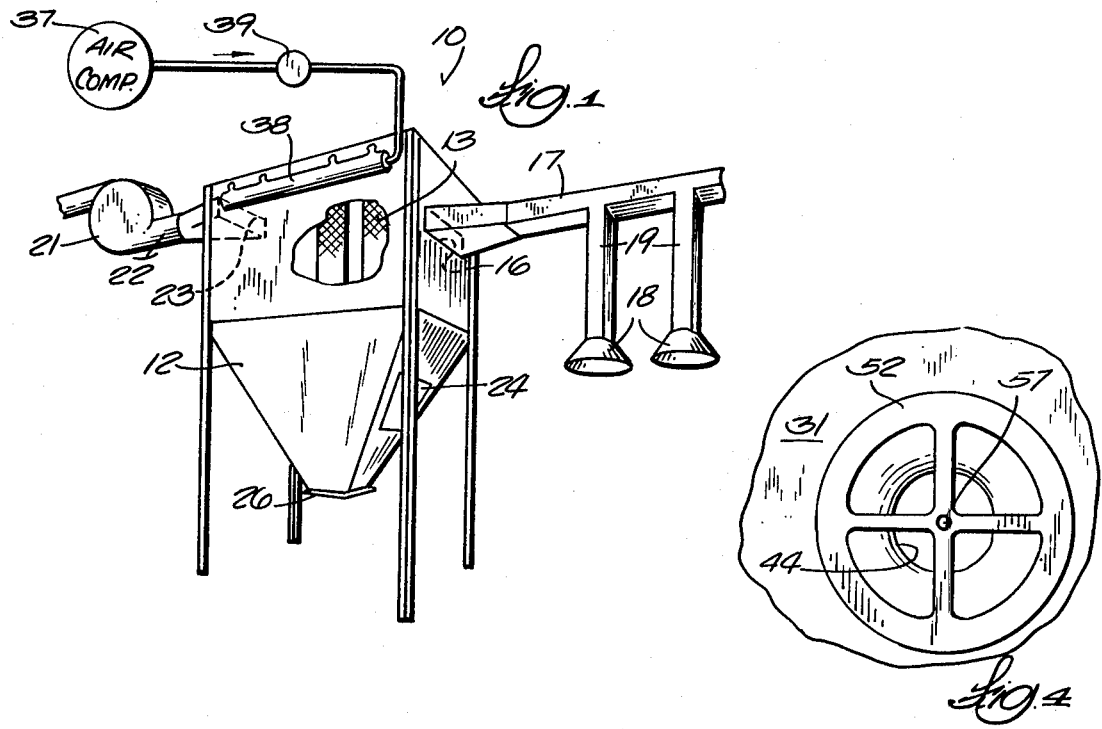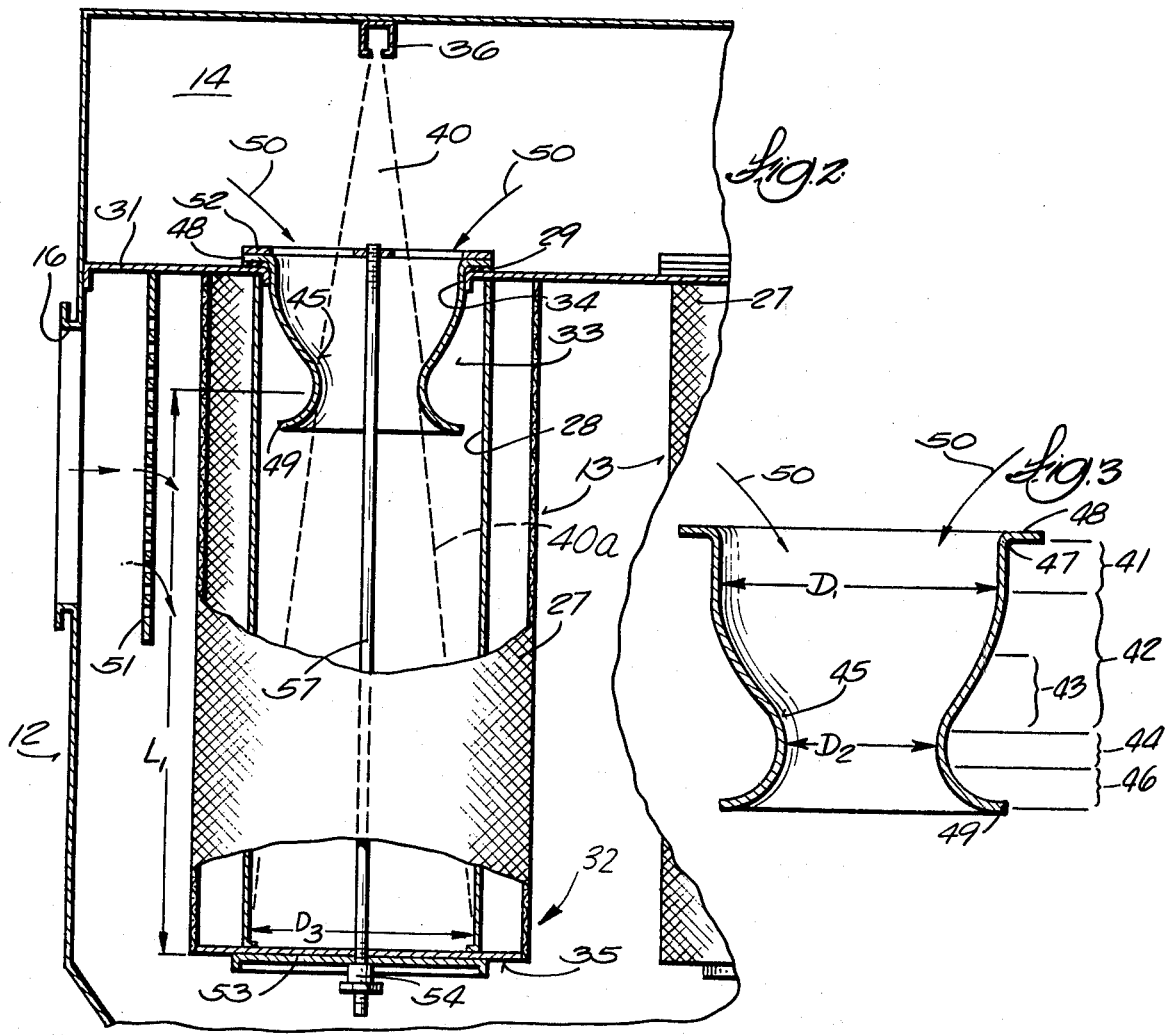

FILTER APPARATUS WITH REVERSE FLOW CLEANING

FIELD OF THE INVENTION

This invention relates to filter apparatus and, more particularly, to such apparatus as utilize a reverse stream of compressed air to periodically clean the filter medium.

BACKGROUND PRIOR ART

In a particular class of air filter apparatus, commonly referred to as dust collector systems, it is known to utilize a reverse pulse of compressed air to clean contaminants which have accumulated on the filter medium. It has also been known to utilize various arrangements, such as venturi sections, to enhance the flow of the reverse stream for pressurization of the interior of the filter assemblies in the cleansing operation. Examples of some prior art arrangements of this type can be found in U.S. Pat. Nos. 3,436,899, 3,499,268, 3,538,687 and 3,798,878.

Among the general objects of this invention are to improve the overall effectiveness of such filter arrangements. A more specific objective is to increase the efficiency of the reverse pulse stream and thereby improve the effectiveness of the overall filter medium cleaning.

BRIEF SUMMARY OF THE INVENTION

For the achievement of these and other objects, this invention is directed to an inductor unit through which a reverse stream of compressed air is introduced into the filter assemblies for cleaning. The inductor includes a bell-mouth section through which the reverse stream initially enters the inductor unit. The bell-mouth section has a generally arcuate portion which is convex to both the exhaust chamber of the filter unit and the interior of the inductor unit, and it terminates in a laterally extending flange. The arcuate section connects to a generally arcuate section of the inductor which is generally concave to the inductor interior and defines a generally tapered section. The concave arcuate section merges with a restricted throat area. The restricted throat area is generated as a semi-circular surface which is convex to the interior of the inductor and the concave section merges therewith generally as a tangent. This results in an inductor unit which is generally bowl-shaped above the venturi throat and in the area through which the reverse airstream enters the unit. The inductor thus flares generally along a taper from the throat area to a major diameter section, i.e., the bowl-shaped section. The diameter of restricted throat is less than the major diameter of the bowl-shaped section and the inductor unit is so arranged relative to the reverse airstream that the airstream enters the inductor unit but does not directly impinge on the interior walls thereof until it reaches an area immediately adjacent and upstream of the restricted throat. This permits air to be aspirated into the inductor unit over the bell-mouth section. That aspirated air efficiently accelerates and merges with the main reverse airstream in an efficient and effective manner because of the configuration just described. The reverse stream, with the aspirated air merged therewith, is accelerated through the restricted throat and discharged into the interior of the filter assembly. This pressurizes the filter assembly from the interior to effectively clean contaminants from the outer surface of the filter medium.

Preferably the minimum inner diameter of the filter medium and the distance between the minimum diameter of the throat area and the minimum inner diameter of the filter medium or end of filter medium with respect to the minimum throat diameter are such that the air stream does not directly impinge on the interior walls of the filter medium.

Preferably, the downstream end of the inductor also has a bell-mouth configuration with an arcuate section convex to the interior of the inductor and merging on generally the same radius with the arcuate section of the restricted throat and terminates in a laterally extending flange. This bell-mouth section permits effective acceleration of the filtered air on normal filtering operation into the inductor. The inductor unit in turn, because of the above described interior configuration, provides for effective deceleration of the filtered air as it expands through the unit into the exhaust chamber.

Also, in the preferred embodiment, the inlet of the contaminated air to the filter assembly is aligned with the suspended filter units and generally with the upper portions thereof. A perforated baffle overlies the inlet and achieves an initial separation of airborne contaminants. The baffle also influences a generally downward stream of the incoming air to enhance this initial separation of contaminants and also has a cleaning effect over the outer surface of at least the initial row of filter assemblies.

Other objects and advantages will be pointed out in, or be apparent from, the specification and claims, as will obvious modifications of the embodiment shown in the drawings in which:

FIG. 1 is a partially schematic view of the exterior of a dust collector;

FIG. 2 is a cross section of a portion of the dust collector;

FIG. 3 is an enlarged view of the inductor unit; and

FIG. 4 is a plan view of a filter assembly as viewed from the exhaust chamber.

DESCRIPTION OF THE PREFERRED EMBODIMENT

A common type of filter apparatus to which this invention is particularly well-suited is referred to as a dust collector or dust collector system. The invention will be discussed as embodied in such a system but it should be appreciated that the invention may have wider application than the one in which it will be discussed.

With reference to the drawings, filter apparatus 10 is central to the overall dust collection system. It includes a dust collecting hopper 12 in which a series of filter assemblies 13 are suspended, in a manner to be described hereinafter. The apparatus also includes an exhaust or clean air chamber 14 above the suspended filters. A plurality of filter assemblies are arranged in a row and a plurality of such rows are suspended in the hopper; this arrangement is conventional and has not been illustrated in its entirety.

Contaminated air is introduced into the hopper by means of side inlet 16 and duct work 17. The contaminated air can come from any source, for example, fume collector hoods 18 at a welding station. Two such collector hoods are illustrated schematically in FIG. 1. Collector hoods 18 are located adjacent a welding area and flexible conduit 19 connects those hoods to duct work 17.

A conventional fan 21 is connected by duct work 22 to an outlet opening 23 in exhaust chamber 14. Fan 21 draws air from the exhaust chamber creating a pressure drop across the filter assemblies 13 to influence the flow of contaminated air into the hopper and through the filter assemblies.

An access door 24 is provided in hopper 12 for maintenance, such as replacement of the filter assemblies, and a discharge door 26 is provided at the bottom of the hopper to periodically empty dust and other contaminants which have collected in the hopper.

Turning now to FIGS. 2 and 3, each filter assembly 13 (and only one will be described as the description applies to all) includes filter medium 27 made of a conventional material which is pervious to air but not to airborne contaminants. The medium is preferably cylindrical as illustrated and also pleated to increase the available filtering surface area in the space allotted.

The filter medium is assembled over a metal cage 28 which provides mechanical support for the medium but has a generally open construction so as not to interfere with airflow. The filter assembly is sealed by gasket 29 to header plate 31 about an opening 34 formed therein. The plate 31 divides exhaust chamber 14 from the lower hopper chamber. The lower end 32 of the filter assembly is also suitably sealed at 35 in a conventional manner.

An inductor unit 33 is located at the sealed opening 34 between the exhaust chamber and the hopper. The inductor unit forms the opening between the interior of filter unit 13 and the exhaust chamber. The exhaust chamber and the lower hopper are thus sealed except through the filter assemblies and inductors 33 so that all airflow therebetween occurs through the filter assemblies and the inductor.

As stated above, the filter medium is impervious to airborne contaminants which, when their flow is interrupted by the filter medium, either adhere to the outer surface of the medium or fall from the medium into the hopper. It is well known that the efficiency of the filter medium improves as airborne contaminants are collected as a cake on the outer surface. It is also recognized that the thickness of that cake should be kept at an approximate minimum thickness and excessive build-up should be avoided. Excess build-up can substantially increase the pressure drop across the filter assembly and can reach the point where airflow through the filter unit 10 is virtually impossible. Accordingly, periodic cleaning of the filter assembly to remove at least a portion of the accumulated cake has been recognized as desirable and various arrangements have been proposed to achieve that cleaning. One such proposal consists of selectively injecting a reverse jet of compressed air into the filter assembly, i.e., reverse in the sense that it is in a direction opposite to the flow of air through the unit during a regular filtering cycle.

This invention is concerned with that type of proposal and to that end a nozzle 36 is located above each inductor 33. The nozzle, or nozzles receive compressed air, on a selective controlled basis, at a pressure of approximately 80–90 psi from a suitable source of compressed air 37 and a manifold 38. The manifold is connected to rows of nozzles 36 which are in turn each centrally located above each of the inductors 33. The compressed air can be delivered in discrete pulses or as a continuous stream as desired. The control over compressed airflow is shown schematically as including valve 39.

The reverse pulse 40, illustrated by the dashed line in FIG. 2 passes through inductor 33 into the filter interior. The pressure within the filter increases with this airflow and produces a reverse flow of air from the interior of the filter, through the filter medium and into the hopper. This dislodges at least a portion of the cake which has collected on the filter assembly. The dislodged cake falls to the bottom of the hopper.

This invention is concerned with improving the efficiency of the injected reverse airstream and in that regard the specific configuration of inductor unit 33 will now be discussed.

The efficient use of the reverse airstream to pressurize the interior of the filter element determines the effectiveness of the cleaning operation. Any energy losses as the reverse stream passes through the inductor unit into the bag interior detract from that effectiveness. The configuration and arrangement of the walls of inductor unit 33 are such as to minimize energy losses as the reverse stream enters and passes through the inductor unit.

More specifically, the inductor unit at its upstream end (upstream with reference to the direction of flow of the reverse stream) has a bell-mouth shaped section 41, a bowl-shaped section 42 which tapers into and merges with throat section 44. The inductor unit terminates in a bell-mouth shaped section 46 at its downstream end.

As to specific configuration, the inductor is generally circular through any radial cross-section. Bell-mouth section 41 includes an arcuate portion 47 which is convex to the exhaust chamber and the interior of the inductor unit and terminates in lateral flanged end 48. Section 42 is generally bowl-shaped and has a major diameter D1. The wall of section 42 merges with arcuate section 47 and throat section 44. The bowl-shaped section 42 includes an arcuate portion 43 which forms the actual connection to the throat section, section 43 being concave to the inductor unit interior. Throat section 44 is arcuate and convex to the interior of the inductor unit and portion 43 merges with the throat section generally as a tangent to the semispherical surface defined by the radius of the throat section. The throat section defines a restricted passage having a diameter D2 which is less than diameter D1. The throat section thus flares, or tapers, upwardly into the bowl-shaped section.

Section 46 is also arcuate and is convex to the interior of the inductor unit and the filter assembly. This section terminates in a lateral flange portion 49. The bell-mouth section 46 is generated on a radius substantially equal to that of throat section 44.

The arrangement of the elements are such that the reverse airstream 40 will pass through bell-mouth section 41 into bowl-shaped section 42 without directly impinging on the walls thereof until it reaches the generally arcuate shoulder 45 adjacent the throat 44. For optimum results the point of initial impingement of the airstream should be as near as possible to the minimum diameter D2 but still upstream or on the exhaust side thereof. The reasons are, one, energy losses in the airstream will increase directly as the point of initial impingement gets further into the bowl-shaped section and away from the minimum diameter D2 and, secondly, impingement upstream of the minimum diameter D2 seals the filter interior to prevent the cleaning air from escaping through the throat 44 as the interior of the filter becomes pressurized. This is accomplished by controlling both the exit angle of the airstream from nozzle 36 and the distance of the nozzle from minimum diameter D2, also taking into consideration the diameter D2.

Therefore, as the stream 40 passes through bell-mouth section 41, it will aspirate additional air into the inductor unit from the exhaust chamber as illustrated by arrows 50. This air enters bell-mouth section 41 and accelerates and becomes entrained with stream 40 as it passes through the enlarged diameter section 42 and along tapered section 43 after which it passes through throat 44 with the principal reverse airstream. The particular bell-mouth configuration of section 41 allows this aspirated air to enter the inductor with minimum energy losses. Correspondingly, the generally open area provided by enlarged bowl-shaped section 42 permits the aspirated air to continue its flow through the inductor, again without major energy losses. Section 42 and the generally tapered wall section 43 permit the aspirated air to gradually accelerate with the mainstream 40 with minimum energy losses. This effectively produces an increased volume of air through throat 44 for most efficient pressurization of the interior of the filter assembly and ultimate cleaning. With this particular configuration, the ratio of actual air introduced into the filter assembly to the volume of air provided by reverse stream 40 has been shown to be approximately 4 to 1. With that type of improved efficiency, the user has the selection of either providing for adequate cleaning with reduced power or operating with smaller dust collectors which can be more effectively cleaned on a periodic basis.

In order to prevent damage to the interior of the filter medium 27, this invention also proposes to eliminate direct impingement of the airstream portion 40a on the interior surfaces of the filter medium. To that end the relationship of the length L1 of the filter medium from the minimum diameter D2 to the bottom assembly plate 53 is controlled. This relationship is such that the initial area of impingement of airstream portion 40a is on the assembly plate not on the filter medium. In a preferred construction, the approximate dimensions are D2 is 4" and L1 is 22" and, in that construction, D3 is 10". Generally the relationships which should be maintained are L1 should be approximately 5 times D2 when D3 is no less than approximately 2.5 times D2. In the preferred embodiment where the filter medium is cylindrical D3 is the interior diameter thereof and L1 is the distance from D2 to the bottom of the filter medium, i.e. to the bottom plate. In a broader concept, D3 is the minimum inner diameter of the filter medium and L1 would be the distance from D2 to that minimum diameter.

During normal operation, i.e., the normal filtering operation, the inductor unit 33 also provides additional benefit. The bell-mouth section 46 provides an efficient acceleration of filtered air from the interior of the filter assembly into the inductor unit. Tapered section 43 and bowl-shaped section 42 provide efficient deceleration or expansion of the filtered air as it expands and exits into the exhaust chamber. This deceleration is such that the air expands into the exhaust chamber with minimum turbulence and separation. It would be noted that, although the inductor unit functions in the nature of a Venturi, it offers advantages over usual venturi type arrangements. The semi-spherical merging of bell-mouth section 46 and throat 44 on virtually the same radius eliminates the vena contracta usually present in a venturi and which can produce turbulence with attendant separation and loss of airflow efficiencies.

In the preferred embodiment of this invention, inlet 16 is located generally in alignment with filter assemblies 13 and with respect to the upper portions thereof. A perforated baffle 51 is supported from header plate 31 and overlies the inlet 16. With this arrangement, contaminated air entering the hopper first encounters the perforated baffle. Airborne contaminants which strike the baffle will have a tendency to flow downward by gravity into the hopper and not be impinged on the filter assembly. In addition, the baffle itself has a tendency to direct airflow downwardly over the outer surface of at least the rows of filter assemblies nearest the inlet which further influences the downward flow of contaminants striking the baffle, and has a tendency to cause the incoming air to flow downwardly over the outer surface of the air filter assemblies with a partial cleaning effect on those assemblies.

The connection of the filter assemblies to the header plate 31 is made by a threaded connector rod 57. This rod is threaded into a spider 52 overlying the rim of the inductor unit. The lower end of rod passes through filter assembly plate 53 and carries a threaded hand knob 54. When hand knob 54 is tightened, header plate 31 is clamped between flanged end 48 and cage 28. Seal 29 is interposed between the header plate and the flanged end to seal the top of filter assembly. The filter can be readily replaced by removing hand knob 54, removing the cartridge consisting of the cage, plate 53, seal 35 and the pleated filter medium and replacing them with a new cartridge.

Although but one embodiment of the present invention has been illustrated and described, it will be apparent to those skilled in the art that various changes and modifications may be made therein without departing from the spirit of the invention or from the scope of the appended claims.

I claim:

1. Filter apparatus comprising, in combination, a hopper, an exhaust chamber, at least one filter assembly disposed in said hopper and having a gaseous medium flow opening communicating with said exhaust chamber, said filter assembly including a filter medium having inner walls, said hopper being generally sealed from said exhaust chamber except through the filter medium of said filter assembly, means defining an inlet into said hopper for introducing contaminated gaseous medium into said hopper so that said contaminated gaseous medium is caused to flow to said exhaust chamber through said filter medium and contaminants are accumulated on said filter medium, a generally hollow inductor unit positioned at the opening of said assembly to said exhaust chamber and through the interior of which gaseous medium passes in flowing between said hopper and said exhaust chamber, means for selectively directing a reverse stream of air into said inductor unit from the exhaust chamber side thereof so that said reverse stream of air enters said filter assembly and flows through said filter medium in the reverse of the direction of contaminated gaseous medium flow to remove accumulated contaminants from said filter medium, said inductor unit including,
- a bell-mouth section at the opening of said filter assembly to said exhaust chamber,
- a throat spaced from said bell-mouth section away from said exhaust chamber and having a diameter less than that of said bell-mouth section,
- and means defining a wall extending from said bell-mouth section to a generally arcuate shoulder adjacent said throat and having a major diameter which is generally greater than the diameter of said throat so that said reverse stream entering said inductor unit does not impinge directly on said wall until it reaches said shoulder and said stream aspirates gaseous medium into said inductor unit which combines with said reverse stream and flows into said filter assembly and through said filter medium, said throat having a minimum diameter area, said filter medium having a minimum inner diameter,
and the distance from said minimum diameter throat area to said minimum filter medium diameter area and the relationship of said minimum throat area diameter to said minimum filter medium diameter are such that the airstream being discharged from said throat area does not impinge directly on the inner walls of said filter medium.

2. The filter apparatus of claim 1 wherein
said throat diameter is D2,
said minimum filter medium diameter is no less than 2.5 D2, and
said distance from said minimum throat diameter to said minimum filter medium diameter is approximately 5 times D2.

3. The filter apparatus of claim 2
wherein said filter medium is generally cylindrical,
including a plate closing the end of said filter medium spaced from said inductor unit,
and wherein initial impingement of said airstream within said filter assembly is on said plate.

4. Filter apparatus comprising, in combination,
a hopper,
an exhaust chamber,
a wall separating said exhaust chamber from said hopper,
means defining an opening in said wall,
a generally hollow inductor unit positioned at said opening,
at least one filter assembly disposed in said hopper and having a gaseous medium flow opening communicating with said inductor unit, said filter assembly including a filter medium having inner walls,
means for providing a sealed connection between said inductor unit and said wall so that said hopper is generally sealed from said exhaust chamber except through said inductor unit and the filter medium of said filter assembly,
means defining an inlet into said hopper for introducing contaminated gaseous medium into said hopper so that said contaminated gaseous medium is caused to flow to said exhaust chamber through said filter medium and contaminants in said flow are accumulated on said filter medium,
means for selectively directing a reverse stream of air into said inductor unit from the exhaust chamber side thereof so that said reverse stream of air enters said filter assembly and flows through said filter medium in the reverse of the direction of contaminated gaseous medium flow to remove accumulated contaminants from said filter medium,
said inductor unit including,
- a bell-mouth section at the opening of said filter assembly to said exhaust chamber,
- a throat spaced from said bell-mouth section away from said exhaust chamber and being generally arcuate and convex to the interior of said inductor unit,
- and means defining a wall extending from said bell-mouth to said throat, said throat having a diameter which is generally smaller than the diameter of said bell-mouth and so that said reverse stream entering said inductor unit impinges on said wall upstream of said throat and said reverse stream aspirates gaseous medium into said inductor unit which combines with said reverse stream and flows into said filter assembly and through said filter medium,
said throat having a minimum diameter area,
said filter medium having a minimum diameter,
and the distance from said minimum diameter throat area to said minimum filter medium diameter area and the relationship of said minimum throat area diameter to said minimum filter medium diameter being such that the airstream being discharged from said throat area does not impinge directly on the inner walls of said filter medium.

5. The filter apparatus of claim 4 wherein
said throat diameter is D2,
said minimum filter medium diameter is no less than 2.5 D2, and
said distance from said minimum throat diameter to said minimum filter medium diameter is approximately 5 times D2.

6. The filter apparatus of claim 5
wherein said filter medium is generally cylindrical,
including a plate closing the end of said filter medium spaced from said inductor unit,
and wherein initial impingement of said airstream within said filter assembly is on said plate.

7. Filter apparatus comprising, in combination,
a hopper,
an exhaust chamber,
a wall separating said exhaust chamber from said hopper,
means defining an opening in said wall,
a generally hollow inductor unit positioned at said opening,
at least one filter assembly disposed in said hopper and having a gaseous medium flow opening communicating with said inductor unit, said filter assembly including a filter medium having inner walls,
means for connecting said inductor unit to said wall,
means defining an inlet into said hopper for introducing contaminated gaseous medium into said hopper so that said contaminated gaseous medium is caused to flow to said exhaust chamber through said filter medium and contaminants in said flow are accumulated on said filter medium,
means for selectively directing a reverse stream of air into said inductor unit from the exhaust chamber side thereof so that said reverse stream of air enters said filter assembly and flows through said filter medium in the reverse of the direction of the contaminated gaseous medium flow to remove accumulated contaminants from said filter medium, said inductor unit including a first section at the opening of said filter assembly to said exhaust chamber through which said reverse stream of air enters said inductor unit and a throat section spaced from said first section away from said exhaust chamber and having a diameter less than that of said first section, said throat section having a minimum diameter area, said filter medium having a minimum diameter, and the distance from said minimum diameter throat area to said minimum filter medium diameter area and the relationship of said minimum throat area diameter to said minimum filter medium diameter being such that the airstream being discharged from said throat area does not impinge directly on the inner walls of said filter medium.

8. The filter apparatus of claim 7 wherein said throat diameter is D2, said minimum filter medium diameter is no less than 2.5 D2 and said distance from said minimum throat diameter to said minimum filter medium diameter is approximately five times D2.

9. The filter apparatus of claim 7 wherein said filter medium is generally cylindrical, including a plate closing the end of said filter medium spaced from said inductor unit, and wherein the initial impingement of said airstream within said filter assembly is on said plate.

* * * * *